Sept. 20, 1927.
W. T. KYLE
1,643,123
TRAFFIC PROTECTIVE STRUCTURE
Filed Dec. 3, 1924
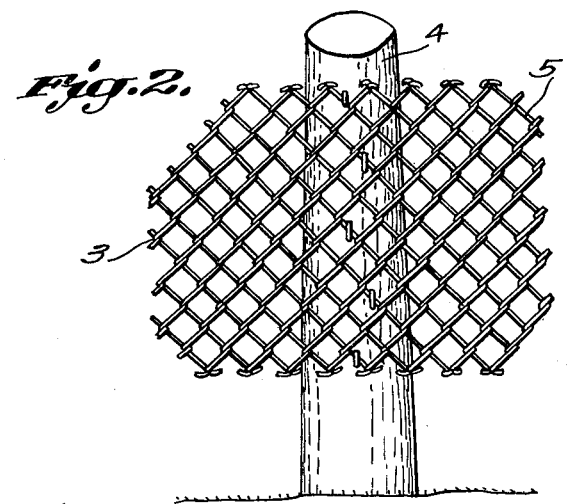
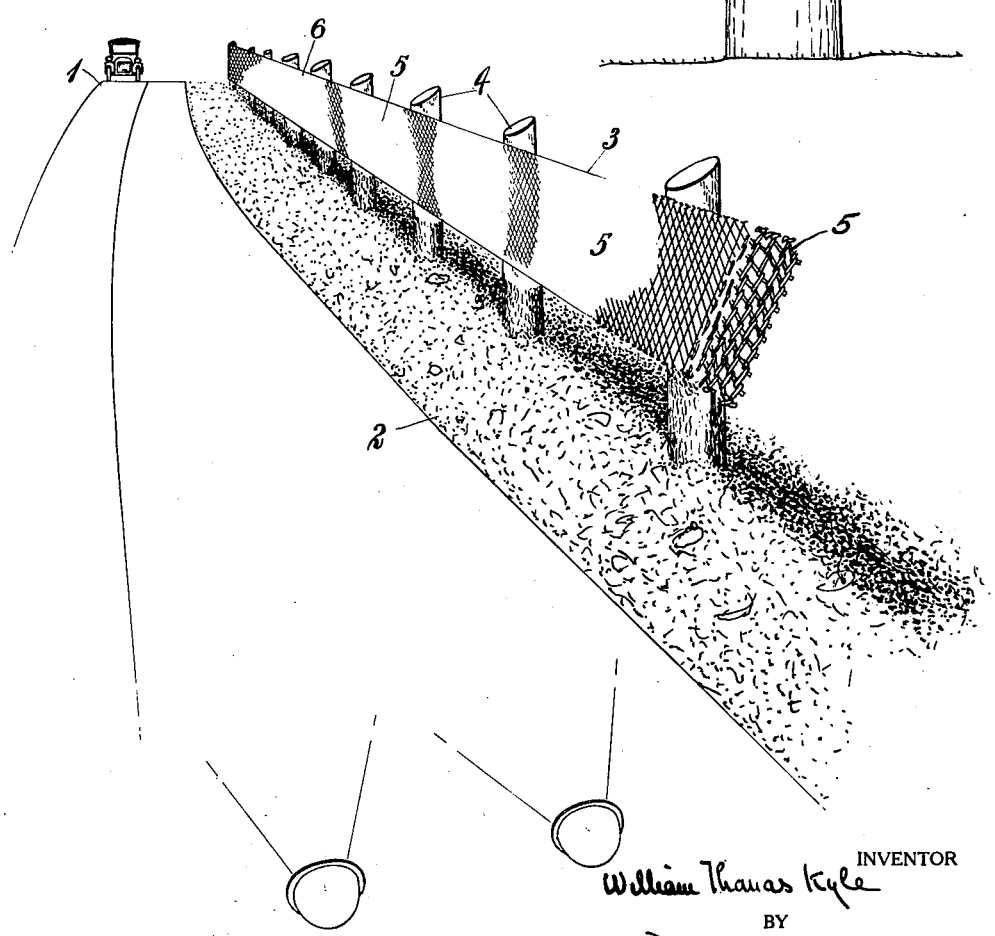
INVENTOR
William Thomas Kyle
BY
Frederick P. Duncan, ATTORNEY Patented Sept. 20, 1927.

1,643,123

UNITED STATES PATENT OFFICE.

WILLIAM THOMAS KYLE, OF BRIDGEPORT, CONNECTICUT, ASSIGNOR TO PAGE STEEL AND WIRE COMPANY, A CORPORATION OF NEW JERSEY.

TRAFFIC PROTECTIVE STRUCTURE.

Application filed December 3, 1924. Serial No. 753,662.

This invention relates to safety devices for traffic, and has for its object the providing of a highway guard in the form of semi-rigid metal barrier of sufficient strength to resist the impact of an automobile, but yielding to the extent of not suffering demolition, even under heavy impact, and of absorbing the shock of collision by the gradual stretching of the material constituting the barrier.

The barrier is of foraminous or open mesh metal, preferably a woven wire mesh of high grade steel formed in a strip of uniform width firmly supported on rigid posts at a substantially constant distance from and near the margin of the highway. Preferably the barrier material is given a very light color, so that under illumination afforded by the lights of an automobile, it will not only be highly visible itself and thus afford a serviceable guide to the changes in the direction of the road and will signal the approach to danger, but its reflective co-efficient will be such that portions of the barrier at a distance from the headlights and parallel to the side of an automobile will transmit to the highway a greater proportion of the illumination than portions of the barrier close to the automobile. Owing, however, to the foraminous or open mesh structure of the barrier it will not reflect an objectionable glare of light opposite or near the side of the automobile or from portions of the barrier that extend across the path of the automobile at curves in the roadway.

In carrying the invention into effect it is preferred to form the metal barrier of a foraminous or open mesh material such as diamond mesh wire netting, as this material has the desired combination of strength and resistance on the one hand and of gradual yielding under impact on the other. This has also been found to possess the highest reflective index for the proper illumination of the highway at a distance, as its effect from afar, with a narrow angle of incidence for the light, is that of an unbroken flat surface so that the light is reflected efficiently to a great distance, increasing the effective range of illumination of the automobile lights, while in the vicinity of the automobile, the open meshes permit the greater part of the light to pass through and accordingly the attention of the driver is not distracted. So, also, at a left-hand or concave curve in the highway, where the barrier sweeps around in front of the light, the foraminous barrier does not dazzle the driver by reflection of all the light as does a board fence or other continuous surface.

The discontinuity of surface in the pattern of dark diamonds, with intervening illuminated wires, is also agreeable to the eyes, not causing fatigue, and hence is more effective as a warning barrier than would be a solid surface with conventional stripes of black and white paint, the latter being also more costly. It is possible to coat the foraminous barrier before erection, thus affording a more permanent coating.

Referring to the drawing, Fig. 1 shows in perspective a highway 1, along the margin 2 of which is extended for a substantial distance a barrier 3 of foraminous material, preferably following the marginal contour of the highway as nearly as possible at a uniform distance, the barrier being shown as formed of a breadth of wire netting of diamond mesh, uniform in width and supported on posts 4, and of a very light color, which may conveniently take the form of a coating 5 of white elastic enamel paint, applied by dipping the netting and baking it before erection. Fig. 2 is an enlarged detail of the diamond mesh netting shown in Fig. 1.

In the illustrated embodiment the highway is shown as curved and has a rough margin 2, falling away below the barrier, which accordingly affords an extremely desirable protection from a very dangerous hazard, and especially when the latter is approached simultaneously by cars running in opposite directions, in which event the driver of the car approaching from the direction in which the reader is observing the drawing will not only have early warning of the hazard through the broad illumination by his lights of the barrier at the distant point 6, where its surface appears continuous, and where the reflection of light to the rough margin 2 is of maximum effect, but this driver will also, when he has once picked up the barrier in his field of vision, be enabled to use it as a guide, without conscious effort, no matter how strong may be the glare from the lights of the approaching car.

It is to be understood that in the darkness of night, the space in each mesh of the wire netting is dark, so that the part nearest the driver only shows the relatively narrow light lines of the wire, in diamond pattern, and this effect is also obtained when running directly toward such a barrier on a left-hand curve.

The operation of, and results produced by such foraminous or open mesh metal barrier are radically different from those of the usual wooden or metal rail guard or of a heavy stone wall or similar barrier. When the barrier illustrated and described herein is struck by an automobile, the meshes of the fabric tend to lengthen longitudinally and flatten vertically and thus the fabric as a whole resistantly stretches lengthwise and narrows transversely. Such deformation takes place gradually with accompanying resistance, and thus resists the impact of the vehicle bringing it to a stop gradually over an appreciable period of time. This stretching of the fabric dissipates the kinetic energy of the colliding vehicle and serves to cushion the impact and absorb the shock. The great strength of this barrier especially when made of good quality woven steel wire mesh serves to prevent even heavy vehicles moving at high speed from breaking through and the resistant yielding of the barrier when struck serves to absorb the shock of impact by cushioning the blow and reduces to a minimum damage to the vehicle and injury to its occupants. When by repeated or excessive impacts the section of the barrier is badly deformed it can easily and cheaply be replaced by a fresh section of the wire mesh fabric. As, in accordance with the well known laws of physics, the amount of shock absorbed by the barrier depends directly upon the length of time taken in bringing the car to a stop, the use in this barrier of the strong wire fabric above referred to having the capability of resistant but extended yielding under heavy pressure is of great advantage.

In case of impact of a heavy or rapidly moving automobile with a wooden or metal rail barrier or with a solid stone wall or similar highway guard, there is no such resistant yielding and shock absorbing action. If the barrier is not strong enough to resist the impact the vehicle will crash through into the danger spot beyond. If the barrier is strong enough to stop the car it does so practically instantaneously with substantially no shock absorbing or cushioning effect and the entire energy of the rapidly moving car is converted into a shock that is likely to cause serious damage to the vehicle and injury to its occupants.

It is to be noted that the barrier which in practice may, as shown, be approximately two feet in vertical width is mounted on its supports with considerable space from a foot to 15 inches between its lower edge and the ground, thus being at a height corresponding approximately that of the hub of the average automobile. When this barrier so mounted is struck by an automobile there will be no tendency for the wheels to ride over the barrier as it stretches, as might be the case under some circumstances if the barrier extended to the ground, and particularly if the lower edge were rigidly fastened along the ground. When mounted with the lower edge free from the ground as shown herein, the stretching fabric tends to ride above the wheels and engage the chassis or body of the vehicle insuring the gradual but complete stopping of the vehicle as above described.

As my invention can manifestly be embodied in other forms of foraminous metal fabric or of wire mesh netting so formed as to be capable of marked longitudinal stretching and vertical narrowing from deformation caused by impact of a vehicle, and of slowly bringing about the gradual stopping of the vehicle and resultant absorption of shock and cushioning effect that is characteristic of my invention, I do not limit myself to the details of construction above set forth, but what I claim as my invention is as follows:

Having thus described my invention, I claim:

1. A shock absorbing highway guard comprising a series of rigid vertical supports adjacent the side of a highway and, fastened to and extending between said supports, a strip of wire fabric resistingly extensible laterally under impact.

2. A shock absorbing highway barrier comprising a series of rigid vertical supports adjacent the side of a highway and, firmly fastened to and extending between said supports, a foraminous metal strip having elements surrounding the openings therein adapted under impact against the barrier resistingly to lengthen laterally whereby the shock of such impact is gradually absorbed by the barrier.

3. A shock absorbing highway guard comprising a series of rigid vertical supports adjacent the side of a highway and, secured to and extending between said supports and free from the ground, a strip of wire fabric having elements extending generally in a direction longitudinal of the strip, portions of which elements are inclined with respect to the length of the strip and are capable of resistant straightening under impact of an object against the barrier.

4. A highway barrier comprising a series of rigid vertical supports adjacent the side of a highway and, secured to and extending between said supports, a strip of laterally extensible wire netting the lower margin of which is located at a distance above the ground corresponding approximately to the distance above the ground of the hub of the average automobile.

5. A shock absorbing highway guard comprising a series of rigid vertical supports adjacent the side of a highway and, secured to and extending between said supports, a strip of wire netting having meshes resistingly extensible laterally and contractible transversely under impact, said strip having free upper and lower margins.

6. A shock absorbing highway guard comprising a series of rigid vertical supports adjacent the side of a highway and, secured to and extending between said supports a strip of wire netting having meshes resistingly extensible laterally and contractible transversely under impact, said netting being constructed of members of high light reflecting value and with openings permitting direct light rays to pass therethrough.

7. A flexible material for highway guards formed of interwoven flexible elements having portions arranged obliquely longitudinally adapted to permit permanent distortion under impact while gradually resisting and absorbing the shock of said impact, said material being of suitable width for the purpose intended.

In witness whereof I have signed this specification.

WILLIAM THOMAS KYLE.